UNITED STATES PATENT OFFICE.

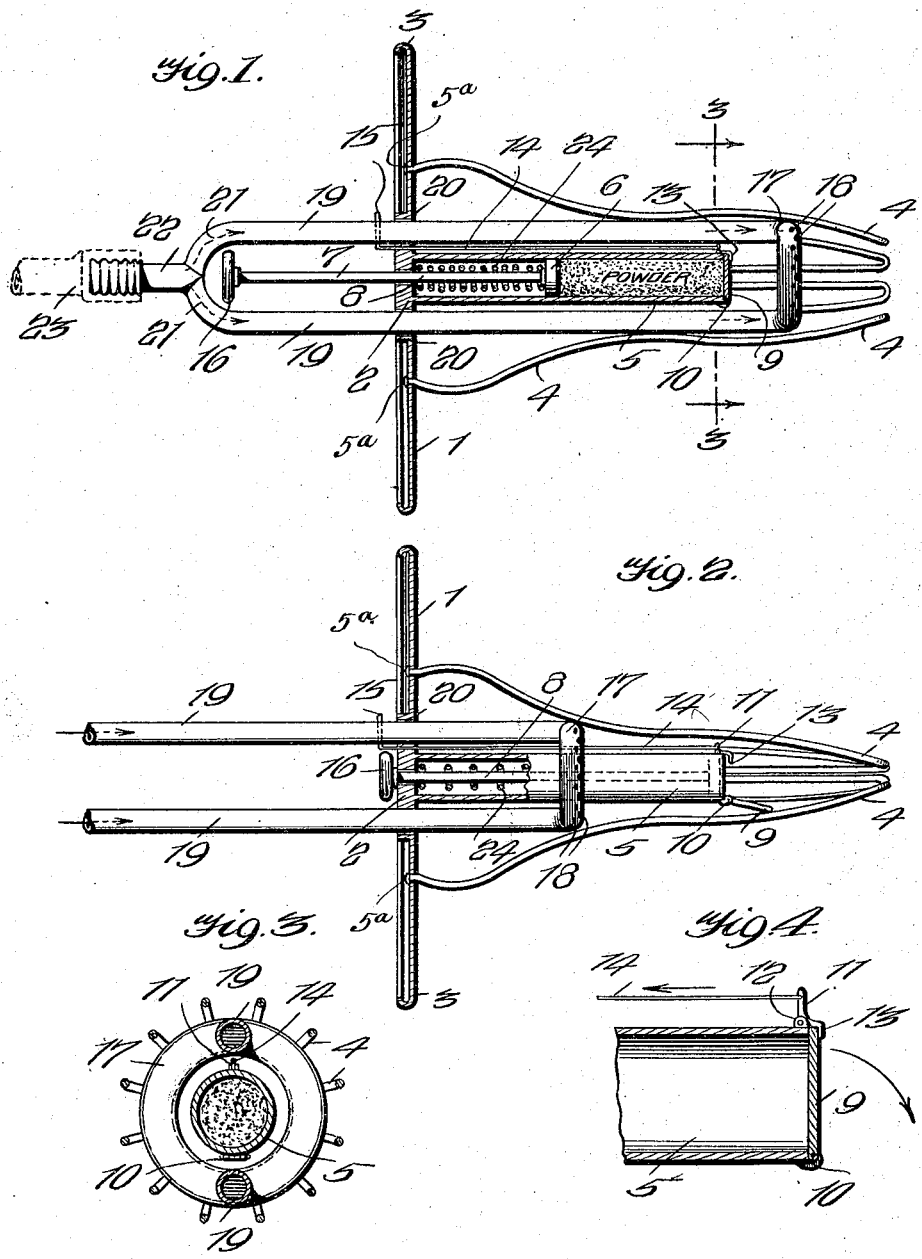

HULON KIRK FINLEY, OF ASPERMONT, TEXAS.

SURGICAL INSTRUMENT.

1,191,683. Specification of Letters Patent. Patented July 18, 1916.

Application filed November 26, 1915. Serial No. 63,457.

*To all whom it may concern:*

Be it known that I, HULON KIRK FINLEY, a citizen of the United States, and a resident of Aspermont, in the county of Stonewall and State of Texas, have invented a new and useful Improvement in Surgical Instruments, of which the following is a specification.

My invention is an improvement in surgical instruments, and the invention has for its object to provide an instrument of the character specified, for use in the prevention and home treatment of diseases peculiar to women, wherein injecting or inserting mechanism is provided in connection with a speculum capable of being expanded or opened or collapsed by the operator when the speculum has been introduced to put the parts on the stretch to expose the inner surface thereof, and to the action of the medicament contained in the injecting or inserting mechanism, and wherein other mechanism is provided in connection with the expanding means for permitting the insertion of medicaments in liquid form.

In the drawings: Figure 1 is a longitudinal section of the improved instrument showing the parts in one position, Fig. 2 is a similar view showing the parts in another position, Fig. 3 is a section on the line 3—3 of Fig. 1, looking in the direction of the arrows adjacent to the line, and Fig. 4 is an enlarged sectional detail of a portion of the inserting or injecting mechanism for dry medicaments.

In the present embodiment of the invention, a plate or disk 1 is provided of suitable material, and of suitable diameter, the said disk having a thickened hub portion 2 and having a marginal flange 3, which is beaded or bent over upon the outer surface of the disk. A series of U-shaped members or loops 4 of wire or the like, is connected with the disk, the said loops or U-shaped members having their ends passed through openings in the disk and headed on the opposite face thereof as indicated at 5ª to retain the loops in place, and the loops are so connected with the disks that they may have a limited movement with respect to the disk. It will be understood that the loops are formed from wire which is more or less resilient to permit the free ends thereof to move away from each other.

The loops are arranged around the center of the disk in annular form, and the said loops are shaped longitudinally in the same manner as a speculum to form a substantially cylindrical or conical outline. The disk 1 is provided with an integral cylindrical extension or barrel 5 coaxial with the disk, and a plunger 6 is arranged within the barrel, the said plunger having a stem 7, which extends through a central opening 8 in the hub of the disk, and the barrel is at the center of the loops 4. This barrel 5 is provided at its outer end with a hinged door or cover 9, the said door or cover being hinged to the body of the extension or barrel at its lower side as indicated at 10, and the cover may be held closed by means of a latch 11, which is pivoted to the barrel at 12, at the opposite side from the hinge. This latch member is in the form of an elbow lever having on one arm a lateral lug 13, which engages outside of the door, and the latch member may be manipulated from the opposite side of the disk 1 by means of a link 14. This link 14 is pivoted at one end to the other arm of the elbow lever, and the link passes through an eccentric opening in the hub 2, and is provided with a handle 15 at the opposite face of the disk from the barrel.

The plunger rod or stem 7 is also provided with a head or handle 16 at this face of the disk to permit the plunger to be manipulated from the said face of the disk. The speculum sections or loops 4 normally occupy the position of Fig. 2 with their ends remote from the disk 1 contacting or almost contacting, as shown.

Means is provided for expanding the loops, the said means being in the form of a hollow ring 17, having discharge openings 18 near its periphery, and near the face adjacent to the barrel 5. The ring 17 is provided with two parallel branches 19, the said branches extending from diametrically opposite points on the ring through eccentric openings 20 in the disk, and the said branches curve inward toward each other at the opposite end from the ring as indicated at 21 to a connection with an externally threaded nipple 22.

The nipple 22 is adapted for engagement by the end of a flexible hose or pipe 23 which may be connected at the other end with a suitable container for supplying liquid to the branches 19 and to the ring 17 for discharging through the openings 18 of the ring.

In operation, the barrel 5 is filled with medicament in powder form, as shown in Fig. 1, the plunger 6 being withdrawn for this purpose. Preferably a coil spring 24 is arranged within the barrel between the hub of the disk and the plunger, the spring acting normally to press the plunger toward the door 9. The plunger is held withdrawn during the insertion of the speculum. The ring 17 which in addition to its irrigating function is a spreader or expander for the speculum occupies the position of Fig. 2, the ring being withdrawn toward the disk 1 by pulling out on the nipple 22. After the speculum has been introduced the ring 17 is pushed inward into the position of Fig. 1, and the ring will engage the speculum loops and will force them outwardly as shown. After the speculum has been expanded the walls of the cavity may be thoroughly irrigated by means of the ring 17. By moving the ring backward and forward every part may be thoroughly cleansed and after cleansing, with the speculum expanded, the link 14 is manipulated to release the latch 11, and the door 9 falls open as shown in Fig. 2, thus permitting the contents of the barrel to be discharged by means of the plunger 6. To discharge the contents it is only necessary to press the head 16 toward the barrel and the powder will be driven out and applied to every part of the walls of the cavity while they are cleansed and on the stretch.

I claim:—

1. An instrument of the character specified, comprising a support having a barrel extending laterally from one face thereof and at the center of the support, a cover or door hinged to the end of the barrel remote from the support, a latch for normally holding the door closed, a link connected with the latch and extending through the support for moving the latch to open the door, a plunger in the barrel and having a stem extending through the support for operating the plunger, a series of speculum blades connected to the support and encircling the barrel and movable toward and from the barrel, an irrigating ring provided with parallel branches, the support having openings through which the branches extend, and the said branches converging at the opposite end from the ring to a common connection, said branches being slidable with respect to the support for permitting the ring to expand the speculum blades, the ring having discharge openings at the face remote from the support.

2. An instrument of the character specified, comprising a support having a barrel extending laterally from one face thereof and at the center of the support, a cover or door hinged to the end of the barrel remote from the support, a latch for normally holding the door closed, a link connected with the latch and extending through the support for moving the latch to open the door, a plunger in the barrel and having a stem extending through the support for operating the plunger, a series of speculum blades connected to the support and encircling the barrel and movable toward and from the barrel, and a common means slidably mounted in the support between the barrel and the blades for expanding the blades and for discharging liquid through the blades.

3. An instrument of the character specified, comprising a support having a barrel extending laterally from one face thereof and at the center of the support, a cover or door hinged to the end of the barrel remote from the support, releasable means for normally holding the door closed, a series of speculum blades connected to the support and encircling the barrel and movable toward and from the barrel, and a common means slidably mounted in the support between the barrel and the blades for expanding the blades and for discharging liquid through the blades.

4. An instrument of the character specified, comprising a support having a barrel extending laterally from one face thereof and at the center of the support, a cover or door hinged to the end of the barrel remote from the support, releasable means for normally holding the door closed, blades connected with the support and a common means slidably connected with the support between the blades and the barrel for expanding the blades and for discharging liquid past the blades.

5. An instrument of the character specified, comprising a support having a barrel extending laterally therefrom provided at its opposite end with a releasable door, blades connected with the support, a plunger in the barrel for ejecting the contents thereof, and an expander for the blades mounted to slide on the barrel toward and from the door.

6. An instrument of the character specified, comprising dilating members, a medicament container disposed within the dilating members, releasable means closing the container, and ejecting means for expelling the contents of the container.

7. An instrument of the character specified, comprising dilating members, a medicament container disposed within the dilating members, releasable means closing the container, ejecting means for expelling the contents from the container, and a spreader disposed between the container and the dilating members.

HULON KIRK FINLEY.

Witnesses:
J. L. STAFFORD,
J. H. SPINILL.

Copies of this patent may be obtained for five cents each, by addressing the "Commissioner of Patents, Washington, D. C."